Patented Apr. 18, 1950

UNITED STATES PATENT OFFICE 2,504,119

PRODUCING EXPLOSIONS ON SURFACES

Joseph H. Frazer and James W. Perry, Havre de Grace, Md., and William R. Johnson, Baytown, Tex.

No Drawing. Application June 20, 1945, Serial No. 600,632

7 Claims. (Cl. 102—23)

(Granted under the act of March 3, 1883, as amended April 30, 1928; 370 O. G. 757)

The invention described herein may be manufactured and used by or for the Government for governmental purposes, without the payment of any royalty thereon.

The present invention relates in general to producing explosions on surfaces, particularly in warfare.

Among the objects of the invention is to provide a method of rendering planted land mines harmless, either by exploding them before they can produce destructive effects or by rendering them inoperative.

Another object of the invention is to provide a method of clearing a path, or producing a safe passageway, over terrain in which land mines have been planted or in which it is suspected that land mines have been planted.

Still another object of the invention is to provide a method for spreading an explosion over surfaces of more or less large area, such as mine fields, parts of the ground or terrain, trenches, fox holes, the surfaces of buildings and structures, such as forts, caves, pillboxes, vehicles and other structures which it is desired to subject to the destructive effects of widespread explosion in warfare.

In practicing the present invention use is made of two liquids which are stable under ambient conditions of temperature and which are not, by themselves, explosives which can be detonated. One of these liquids is a concentrated water solution of perchloric acid, containing for example 68 to 72% of perchloric acid and the remainder water. The other of said liquids is an organic compound of low volatility containing carbon and hydrogen in chemical combination which is miscible with a concentrated water solution of perchloric acid and which is substantially unreactive chemically with the perchloric acid contained in the water solution thereof under the conditions under which the said two liquids are used according to the invention.

Among the liquids containing chemically combined carbon and hydrogen and which are readily miscible with concentrated aqueous solutions of perchloric acid are mentioned: ethylene glycol, diethylene glycol, triethylene glycol, tetraethylene glycol, ethylene glycol monoethyl ether (sold under the trade name "Cellosolve"), diethylene glycol monoethyl ether (sold under the trade name "Carbitol"), ethylene glycol monobutyl ether (sold under the trade name "Butyl Cellosolve"), propylene glycol, dipropylene glycol, dimethoxy tetraethylene glycol, diethylene glycol monomethyl ether (sold under the trade name "Methyl Carbitol"), the acetate of ethylene glycol monoethyl ether (sold under the trade name "Cellosolve acetate"), the acetate of diethylene glycol monoethyl ether (sold under the trade name "Carbitol acetate"), the acetate of diethylene glycol monobutyl ether (sold under the trade name "Butyl Carbitol acetate"); ketones, for example, acetone, and methyl butyl ketone; and monohydric alcohols, for example, normal butyl alcohol.

One, or a mixture of two or more of the above mentioned organic liquids, is mixed with the concentrated aqueous solution of perchloric acid, and this mixture is spread over or sprayed upon the surface over which it is desired to cause an explosion. Then a detonator or detonating agent is fired upon or near the surface upon which the said mixture has been spread or sprayed. The firing of the detonator or detonating agent causes the mixture which has been spread over the surface to detonate, thereby producing an explosion over a large area.

The high explosive characteristics of the mixture described above does not depend upon any chemical interaction, before detonation, between the perchloric acid and the liquid organic agent which is miscible therewith. Indeed, before detonation, there appears to be very little if any chemical reaction between the perchloric acid and the liquid organic agent containing chemically combined carbon and hydrogen, and the terms "substantially unreactive chemically" or like expressions used herein are intended to mean that little or no chemical action takes place at the time of the mixing of the perchloric acid and the liquid organic agent which functions as a fuel in the detonation of the mixture.

A water solution of perchloric acid containing from 70 to 72% of perchloric acid is very suitable for use in practicing the invention.

The perchloric acid is advantageously pumped or forced by air pressure from a container to a mixing nozzle, while one or more of the liquid organic, fuel agents referred to above is pumped or forced by air pressure from a different container to the same mixing nozzle. The perchloric acid and the liquid fuels mentioned above are mixed in the mixing nozzle and the mixture under pressure projected from the nozzle and sprayed or spread upon the desired surface over or upon which it is desired to produce an explosion or detonation. By applying sufficient pressure to the two liquids or to their mixture, the mixture may be applied to surfaces at a considerable distance from the nozzle and personnel using the nozzle. The mixture which has been applied to the desired surface is easily detonated by detonating an electric detonating cap on or near the surface covered by the mixture. Detonation of the mixture applied to the surface may also be effected by exploding a hand grenade, rifle grenade, or explosive bullet containing a charge of high explosive upon or near the surface or area to which the mixture has been applied. A hand grenade is a very convenient means for causing the detonation of the applied mixture, since the detonation of the applied mixture merely involves throwing a high explosive hand grenade on the area or surface covered by the mixture.

The proportions of perchloric acid and the liquid fuel agent miscible therewith may be varied within wide limits. For example, 40 to 60 parts by weight of a water solution of perchloric acid containing 70 to 72% perchloric acid may be used with 20 parts by weight of ethylene glycol monoethyl ether. Two to three parts by volume of 70 to 72% perchloric acid mixed with one part by volume of the miscible liquid fuel may be used. In general, the two liquids should be mixed in such proportion to give a good oxygen balance, or to give the most violent detonation effects.

The invention may be used as follows in clearing a path, or producing a safe passageway through a mine field or terrain where it is suspected that land mines have been planted. The course of the path through the mine field is first decided upon. Then an area, at the beginning of the course, as wide as the path decided upon is sprayed with the above described mixture. After this, the mixture which has been sprayed upon the terrain or ground is detonated in the manner described above or in any other suitable manner. After this detonation, a further area adjoining the area first sprayed, and following the course of the path or passageway decided upon, is sprayed with a further quantity of the mixture, and then the mixture on this sprayed area is detonated. These operations are continued until the entire course of the path or passageway has been followed.

The detonation of the mixture of perchloric acid and the miscible liquid containing chemically combined carbon and hydrogen causes land mines that are planted in the ground in the area sprayed with the mixture either to explode or to become so ruptured or damaged as to be inoperative. Vehicles and soldiers on foot may then safely travel over the path or passageway through the mine field.

Instead of confining the spraying and detonation of the mixture to a path or paths through a mine field, the spraying of areas and detonation of the sprayed areas can be successively carried on until the whole mine field has been destroyed or until entire areas suspected as being mine fields have been rendered clear or safe.

In subjecting a structure to the explosive effects of the mixture, the mixture is sprayed upon the exterior or within the interior of the structure, or upon both the exterior and interior, and the mixture upon these surfaces detonated.

We claim:

1. The method of producing explosions over a surface of solid material which comprises spreading upon the said surface an explosive mixture comprising a concentrated aqueous solution of perchloric acid and a liquid having carbon and hydrogen in chemical combination which is miscible with said solution of perchloric acid, and thereafter detonating said mixture.

2. The method of producing explosions over a surface of solid material which comprises spraying upon the said surface an explosive mixture comprising a concentrated aqueous solution of perchloric acid and a liquid having carbon and hydrogen in chemical combination which is miscible with said solution of perchloric acid, and thereafter detonating said mixture.

3. The method of clearing a mine field which comprises spreading over the ground of the mine field an explosive mixture comprising a concentrated aqueous solution of perchloric acid and a liquid having carbon and hydrogen in chemical combination which is miscible with said solution of perchloric acid, and thereafter detonating said mixture.

4. The method of clearing a path over terrain in which land mines have been planted or in which it is suspected that land mines have been planted, said method comprising spreading upon said terrain an explosive mixture comprising a concentrated aqueous solution of perchloric acid and a liquid having carbon and hydrogen in chemical combination which is miscible with said solution of perchloric acid, and thereafter detonating the said mixture.

5. The method of clearing a path over terrain in which land mines have been planted or in which it is suspected that land mines have been planted, the said method comprising spraying upon said terrain an explosive mixture from prising a concentrated aqueous solution of perchloric acid and a liquid having carbon and hydrogen in chemical combination which is miscible with said solution of perchloric acid, and thereafter detonating the said mixture.

6. The method of producing an explosion upon a surface of solid material which comprises forming an explosive mixture of a concentrated aqueous solution of perchloric acid with a liquid of low volatility having carbon and hydrogen in chemical combination which is miscible with said solution of perchloric acid and substantially unreactive chemically therewith before detonation, projecting the said mixture upon the said surface, and thereafter detonating the said mixture on said surface.

7. The method of producing an explosion upon a surface of solid material which comprises forming a stream of a concentrated aqueous solution of perchloric acid, forming a stream of a liquid of low volatility having carbon and hydrogen in chemical combination which is miscible with said solution of perchloric acid and substantially unreactive chemically therewith before detonation, forming an explosive mixture of said two streams, projecting the said mixture upon the said surface, and thereafter detonating the said mixture on said surface.

JOSEPH H. FRAZER.
JAMES W. PERRY.
WILLIAM R. JOHNSON.

REFERENCES CITED

The following references are of record in the file of this patent:

UNITED STATES PATENTS

| Number | Name | Date |
|---|---|---|
| 1,087,112 | Fiedler | Feb. 17, 1914 |
| 1,169,686 | Simonds | Jan. 25, 1916 |
| 1,248,689 | McAvoy | Dec. 4, 1917 |
| 1,302,904 | Duffie | May 6, 1919 |
| 2,320,903 | Archer | June 1, 1943 |

OTHER REFERENCES

Mellor, Inorg. and Theoretical Chemistry, volume II, N. Y., 1927, pp. 376–380.

Chem. Ztg., vol. 66, p. 415 (1942).

Chem. Zentr., vol. I, p. 1361 (1943) (cited in C. A. 1944, 3842 (5)).